United States Patent [19]
Popa

[11] Patent Number: 6,006,231
[45] Date of Patent: Dec. 21, 1999

[54] FILE FORMAT FOR AN IMAGE INCLUDING MULTIPLE VERSIONS OF AN IMAGE, AND RELATED SYSTEM AND METHOD

[75] Inventor: Sorin Popa, Richmond Hill, Canada

[73] Assignee: Warp 10 Technologies Inc., Toronto, Canada

[21] Appl. No.: 08/926,683

[22] Filed: Sep. 10, 1997

[51] Int. Cl.[6] .................................................. G06F 17/30
[52] U.S. Cl. .......................... 707/101; 707/6; 707/10; 707/101; 707/104; 395/200.49; 395/200.77
[58] Field of Search ......................... 707/6, 104, 513, 707/101, 10; 341/51; 345/513, 467, 58; 395/58, 583, 200.77, 200.49, 114; 358/500; 348/13; 455/5.1; 704/270; 709/234; 705/2

[56] References Cited

U.S. PATENT DOCUMENTS

| | | | |
|---|---|---|---|
| 5,282,255 | 1/1994 | Bovik | 782/239 |
| 5,418,893 | 5/1995 | Schauer | 345/418 |
| 5,432,871 | 7/1995 | Novik | 382/232 |
| 5,477,345 | 12/1995 | Tse | 358/500 |
| 5,537,493 | 7/1996 | Wilkinson | 382/240 |
| 5,542,037 | 7/1996 | Sato et al. | 345/433 |
| 5,568,598 | 10/1996 | Mack et al. | 345/433 |
| 5,583,794 | 12/1996 | Shimizu et al. | 382/243 |
| 5,596,687 | 1/1997 | Peters, Jr. | 345/430 |
| 5,627,590 | 5/1997 | Hamano et al. | 348/402 |
| 5,629,803 | 5/1997 | Son et al. | 359/575 |
| 5,631,644 | 5/1997 | Katata et al. | 341/67 |
| 5,754,784 | 5/1998 | Garland | 395/500.49 |
| 5,790,935 | 8/1998 | Payton | 455/51 |
| 5,802,520 | 9/1998 | Jerkunica | 707/101 |
| 5,815,097 | 9/1998 | Schwartz | 341/51 |
| 5,859,982 | 1/1999 | Lindholm | 395/200.77 |
| 5,872,965 | 2/1999 | Petrick | 395/583 |
| 5,874,986 | 2/1999 | Gibbon | 348/13 |

*Primary Examiner*—Thomas G. Black
*Assistant Examiner*—Diane D. Mizrahi
*Attorney, Agent, or Firm*—Foley & Lardner

[57] ABSTRACT

A system for retrieving an image from a network comprises: (1) a server application; (2) a plurality of image files, each storing an image in a plurality of different versions, and connected to the server application; (3) a client application which enables a user to select and retrieve a desired version of a desired image; and (4) a communication application providing a communication link between the client and server applications wherein, in use, the user can select a desired image and a desired version of that desired image for retrieval and display. The versions of the image are stored such that when a low resolution version of the image has been obtained, a high resolution version can be obtained simply by downloading the difference between the two versions of the image.

7 Claims, 2 Drawing Sheets

FILE FORMAT FOR AN IMAGE INCLUDING MULTIPLE VERSIONS OF AN IMAGE, AND RELATED SYSTEM AND METHOD

FIELD OF THE INVENTION

This application claims the benefit of U.S. Provisional Application No. 60/025,811, filed Sep. 10, 1996.

This invention relates to data transmission and more particularly to the transmission of images over networks.

BACKGROUND OF THE INVENTION

One of the greatest difficulties that users of the Internet and other networks face is the delay in downloading data rich image and graphic files. Many technologies have tried to devise ways to ease the burden of the delay by introducing concepts such as progressive displays which show the user the image as it is being processed, as well as various compression technologies to make the file smaller so that they could be moved through the Internet faster. Currently, there is no truly interactive method of speeding up the time it takes to get the image to the end user as well as to save the image bank or server valuable storage space and communication costs.

SUMMARY OF THE INVENTION

An object of the present invention is to provide an improved method of creating, downloading and storing images.

A further object of the present invention is to provide an improved method of downloading a range of levels of an image.

In accordance with the present invention, there is provided a method of downloading a plurality of levels of an image stored in a differential hierarchical format, utilizing a client Application Programming Interface (API) and a server API, comprising the steps of: identifying at the client API a required level of an image; determining at the client API the levels of the image required to be downloaded; generating at the client API a request to the server API, the request including an image identifier to identify the image, and a list of strips to be downloaded, the list of strips including a number associated with the level of the image, a number associated with the strip, and a number associated with the required colour, transferring from the server API to the client API a plurality of messages specifying the required strips for an intermediate level, and processing at the client API the messages to create the required image levels.

In accordance with the present invention, there is further provided a method of creating and storing an image on a computer file, to enable a plurality of different versions of the image to be accessible by a user, the method comprising the steps of: (1) reading a file of an image; (2) processing the image to form a hierarchical digital representation of the image including a plurality of different versions of the image; and (3) storing the hierarchical digital representation of the image as a second file on a computer readable storage medium.

Preferably, the second file has a pyramidal structure with minimum information of the image at the top of the pyramidal structure and the full, original image at the bottom of the pyramidal structure.

In accordance with another aspect of the present invention, there is provided a method of downloading an image from a network, the method comprising the steps of: (1) providing an image file connected to the network, which image file includes multiple versions of the image, the versions of the image being such that, after downloading a lower resolution version of the image, a high resolution version of the image can be obtained by downloading the difference between the higher and lower resolution version; (2) accessing the file to obtain a version of the image and presenting the image for viewing; (3) subsequently accessing a second version of the image, wherein the second version of the image contains more data than the first version of the image, only the difference between the first and second versions if downloaded, to supplement the previously downloaded data of the first version of the image.

In step (2), after selecting an image, the user selects the size, resolution and number of colours for the desired version of the image.

A further aspect of the present invention provides a system for retrieving an image from a network, the system comprising: (1) a server application; (2) a plurality of image files, each storing an image in a plurality of different versions, and connected to the server application; (3) a client application which enables a user to select and retrieve a desired version of a desired image; and (4) a communication application providing a communication link between the client and server applications, wherein, in use, the user can select a desired image and a desired version of that desired image for retrieval and display.

The present invention provides a new standard for transmission and downloading of images over networks. Developed to address the most pressing problems relating to using the Internet or any other network, the present invention provides an imaging technology that increases the speed of browsing and downloading images by up to 400%, improves the ability to obtain quality printed output from a downloaded image file and dramatically reduces storage requirements of image files, both for the server and the end user. The invention allows a user to retrieve any combination of resolution, dimension and colour quality of an image, without the need for time-consuming pre- or post-processing.

As result, users can produce different versions of an image derived from the same file and gain significant savings in time, storage space and communications costs.

The invention has been developed for maximum flexibility, and is compatible with any hardware computing platform, operating system, communications protocol, compression algorithm and file format resulting in an enabling technology that software developers, image data banks and on line service providers can incorporate into their products and services to make working with images more productive and enjoyable for the end user.

The present invention can be applied to numerous applications like image libraries, interactive web sites, online services and more. It is well suited to licensing and for incorporating in original equipment, to provide the best technology for image based environments.

The present invention has been developed from the inventor's and assignee's knowledge and experience in high speed networking and communications solutions for the display, transfer and storage of multimedia information. Conceptually, it is believed that "the network is the computer". Whereas the PC has contaminated the technology landscape for the last fifteen years, with the proliferation of the Internet, the network has now become the technology of focus. Images are replacing text as the main content that is being communicated and transmitted over networks. Network users browse through pictures and stop to read when an image catches their attention. network users are also impatient, conditioned by the instant gratification offered by the TV converter. Consequently, the speed of transmission and the quality of the images being transmitted has become more critical. For these reasons, the present invention has been developed with a network centric focus, although the technology is applicable for stand alone applications as well.

The present invention enables a user to download any combination of resolution, dimension and colour quality contained in the original image. Today, typical versions of an image include icons, thumbnails, screen (72 dpi), printer (300 dpi) and professional printer 1200 (dpi) versions. With the present invention, these distinct versions are eliminated as any incremental version up to the original image can be selected. For quick browsing a user will select to download enough information for a small or low resolution version of the image. For a better look at an image a user will increase the size, resolution or both. If the user wants to print the image, different versions of the high resolution image can be downloaded depending on the printer used. An important aspect of the present invention is the fact that the process by which more of the image is downloaded is incremental and allows for any combination of resolution, size and colour quality which is represented in the original image. For example, instead of browsing through 72 dpi 12"×12" version of an image, a user can select a 36 dpi 6"×6" version of the image thus increasing the speed of browsing by 400%. When something catches their eye, they can "bring up the volume" by increasing the resolution and/or the size and/or the colour quality. The invention only downloads the difference between what was already downloaded and what still has to download.

To the user, each version of the image appears like a different file, in fact, each version of the image is derived from the same file. the file format is structured in such a way to allow multiple versions of the same image to be downloaded from a single file. Servers no longer have to hold several versions of an image, namely the icon, thumbnail, screen and printer versions.

To the end user, the advantages are clear; faster browsing and downloading of images, reduction in storage space and the ability to obtain high quality printed output.

To the service provider or vendor the benefits are: savings of valuable storage, as the need for multiple versions of the same file is eliminated; increased efficiency, since end users can download their images more quickly, thereby reducing network congestion and communication costs; scalability, as the file format can be used in low and high bandwidth networks; and differentiation, which offers users more control and choice.

Instead of only being able to access just one image, the present invention allows more than one image to be accessed. The images are stored in almost the same disk space.

The present invention utilizes a pyramid with different layers. The last layer or base layer is the original image and has all available information. The other layers have less and less information. This concept is not original. Thus, images are presented in a hierarchical way.

There are two ways of presenting an image in a hierarchical way: (1) Differential; and (2) Non-Differential Where an image is presented using a Non-Differential Hierarchical technique, several versions of the image are available and may be independently accessed. One version of the picture has the minimum detail desired. Each subsequent image contains all the information of the previous picture plus additional detail. For example, the first image may be 125×125, the next 250×250, the next 500×500, and the "real" image (i.e. the image with the most detail available) is 1000×1000.

Where an image is presented using a Differential Hierarchical technique, several versions of the image are also available. However, each image simply builds on the first image. One version of the picture has the minimum detail desired. Each subsequent image contains a differential, i.e. each subsequent image adds detail to the previous image. For example, the first image may be 125×125 [independent]; the next image is simply the difference to build the first image into a 250×250 image; the next image is simply the difference to build the first image into a 500×500 image; the next image is simply the difference to build the first image into a 1000×1000 image, i.e. the "real" image.

The present invention utilizes a Differential Hierarchical Presentation method of presenting an image. Attached to the differential hierarchical structure of the present invention is a communication protocol. The communication protocol determines what has to be downloaded to provide the appropriate differential.

The communication algorithm allows the appropriate information or image to be downloaded from a server. The differential hierarchical structure exists on the server. With a non-hierarchical structure, only the entire image can be downloaded. With a non-differential hierarchical structure, only the entire image of the required detail can be downloaded. With a differential hierarchical structure, only the information needed to update a previously downloaded image needs to be downloaded; therefore, only the minimum required information is downloaded. The communication protocol of the present invention is new, and allows for the downloading of differential hierarchical images.

The present invention utilizes a differential hierarchical architecture. Differential hierarchical architecture has previously only been known as a way of storing pictures to save storage space. The present invention enables access over a network as opposed to local access. Of course, there is an incidental storage advantage. The huge use of the Internet and slow modem speeds that provide the need to download images quickly and efficiently.

The communication protocol enables images to be selected or updated. There is one API on the client side, and one API on the server side. The API is a collection of functions that assist in the building of an application that can transfer images over a network. Such images may be transferred for various purposes, such as printing, displaying, or exporting as a different file format. The images are stored on the server, with each image level being subdivided into strips of a fixed length.

The main steps in the selecting or updating of an image are as follows. First, the client API identifies a specific required level of an image. For example, on the client side, levels 1 and 2 of the image may already exist, and the client API may identify that level 4 of the image is required.

Second, the client API determines which levels of the image are required to be downloaded. In the example, levels 3 and 4 would have to be downloaded.

Third, the client API generates a request to the server API. The request includes: (a) an image identifier, which identifies the image but not the required image levels; and (b) a list of strips to be downloaded. The list of strips specifies: (a) a number associated with the level of the image; (b) a number associated with the strip; and (c) a number associated with the colour required (for example; 1-red; 2-green, 3-blue). See FIGS. 1 and 2.

Fourth, the server API transfers a number of messages. One message specifies the required strips for an intermediate level (in the example, level 3). There may be one message for every strip in the final level (in the example, level 4) to enable the display or printing of the image to be strip by strip.

Fifth, the client API processes the messages one by one and creates the image levels strip by strip. In the case of the final image level (in the example, level 4), the strips are displayed or printed one by one.

Sixth, the levels, once created at the client API, are not deleted until the image is closed by the application. In this way, even if a particular image level is required again, information about the image does not need to be downloaded again.

Other advantages, objects and features of the present invention will be readily apparent to those skilled in the art from a review of the following detailed descriptions of a preferred embodiment in conjunction with the accompanying drawings and claims.

BRIEF DESCRIPTION OF THE DRAWINGS

The embodiments of the invention will now be described with reference to the accompanying drawings, in which.

DESCRIPTION OF THE PREFERRED EMBODIMENT

Figure 1:
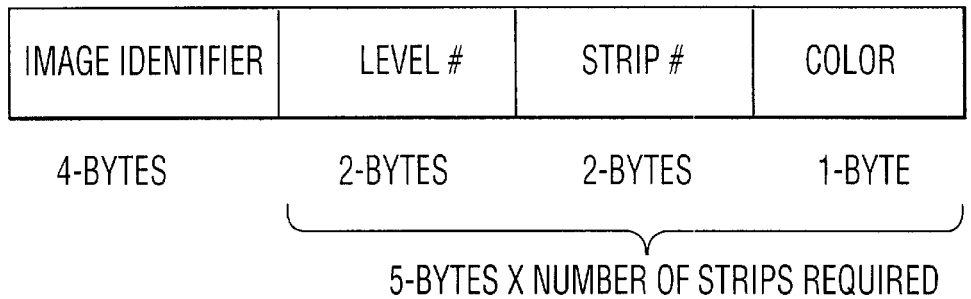
FIG. 1 is a drawing of a client to server message structure.
Figure 2:
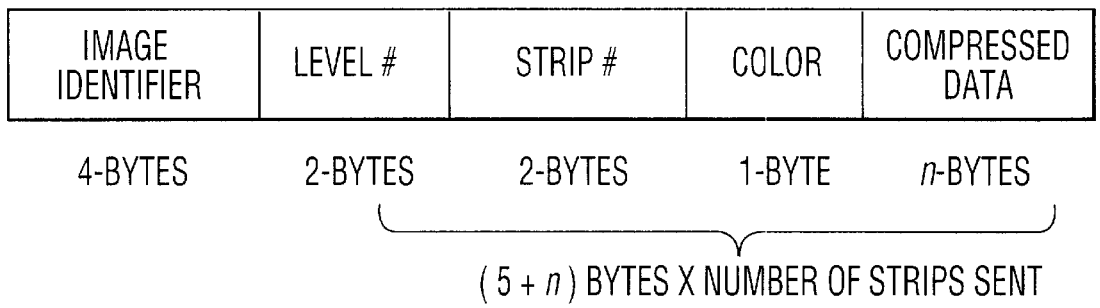
FIG. 2 is a drawings of a server to client message structure.
Figure 3:
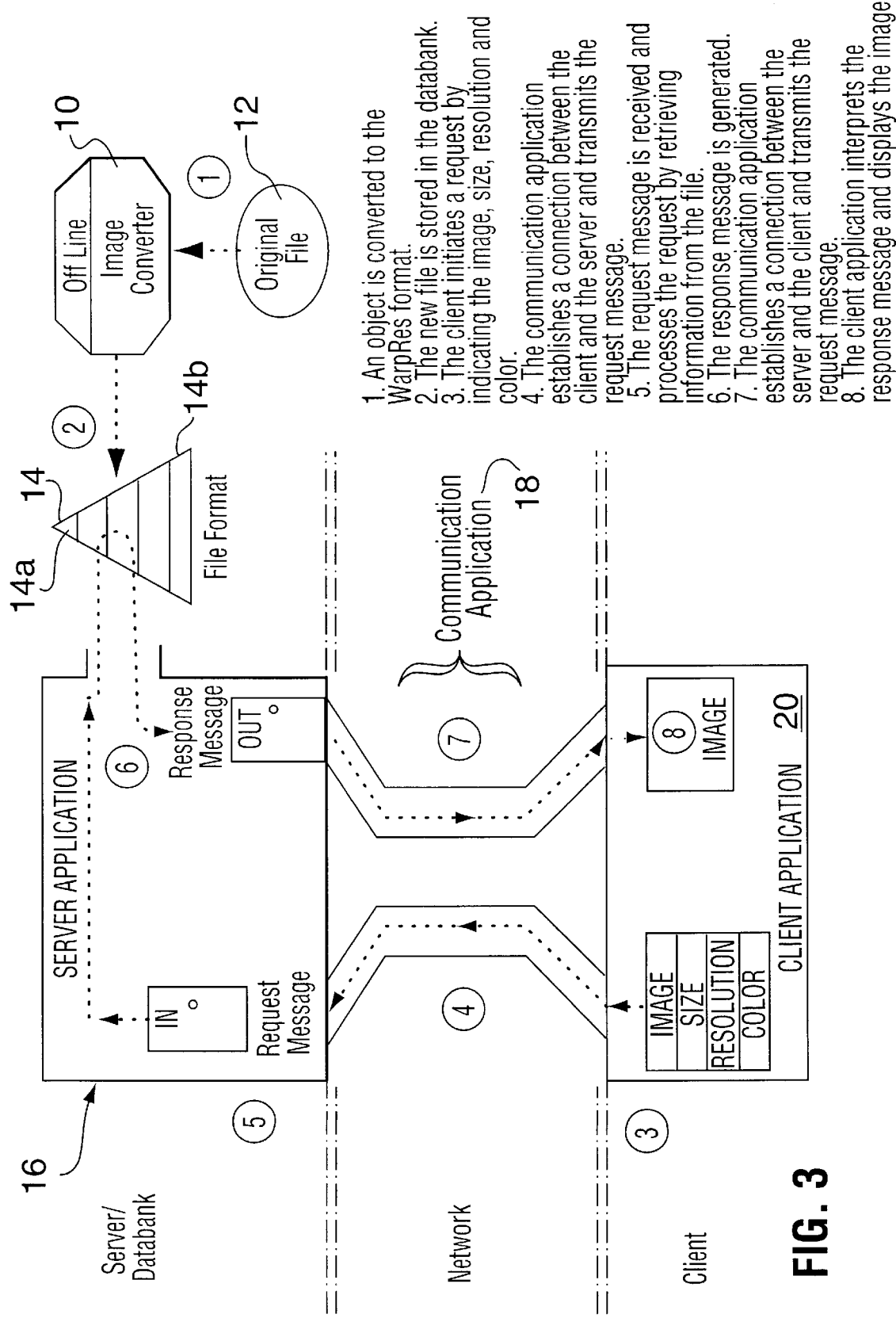
FIG. 3 is a schematic of a preferred embodiment of the present invention.

Referring to FIG. 3, there are shown several interconnected components.

An image converter 10 will take any image file 12, step (1), encode it, and apply compression and recompile the image into a new format 14. The image converter is generally "off line" and not available to the end user, although it is possible that this component could be "on line" thus enabling development of a stand along application.

The file format 14, of the present invention, is created to form a hierarchical digital representation of an image. It is built like a layered pyramid, with the "root" 14a or the minimum information at the top and the information contained in the original image at the bottom 14b (see Figure). the file format contains the information that is necessary to access multiple resolutions, sizes and colour spaces.

A server application 16 can accept a "request message" (see below) for a specific file, resolution, size and colour space. It then finds the appropriate image file, retrieves the relevant information contained in file format and creates a "response message". The server application 16 can respond to numerous requests simultaneously.

A communication application 18 establishes a link between the server application and a client application 20, and transmits the request and response messages.

The client application 20 enables an end user to select (manually or automatically) the image file, size, resolution and colour, and creates the request message.

This "network-centric" design provides the most efficient method to transfer images because it transfers just the pure image data, without pre-processing or post-processing information.

Thus, in use, a user is presented with a client application 20. Typically, this will include a dialogue box enabling the user to select: a particular image; the size of the image; the resolution; and the number of colours. For each of these characteristics, the user will be given certain predefined options. Selection of the desired image formation is indicated at step (3), and is sent as a request, indicated at step (4) over the communication network, e.g. Internet.

As indicated at step (5), the request message is received by the server application and processed. For a first request, the appropriate information is extracted from the file format 14, indicated at step (6) and sent as a response message, step (7), over the network.

The image is received by the client application and displayed to the user, indicated at step (8).

An important aspect of the present invention is that if the user alters the resolution of the image and sends a further request, the server application need only obtain and send information equivalent to the difference between a high resolution image and the original image; in other words it is not necessary for the server application 16 to send the complete high resolution image.

Thus, a user may commonly browse through a number of images at low resolution, small size, since this enables the images to be accessed quickly and the user can then determine which images are of interest. Once an image is selected, the user may then choose to view it on a larger size and with higher resolution, more colours etc. When this request is sent, rather than sending a complete new image, the server application 16 merely sends the difference between the larger, higher content image and the original image received by the client application 20.

The present invention has been designed as the engine for new and enhanced products that take advantage of its technical capabilities. With this in mind it has been developed for maximum flexibility and is compatible with: any hardware computing platform and operating system (e.g. Windows, Apple, UNIX); any communications protocol (e.g. Transport Control Protocol/Internet Protocol); any compression algorithm (e.g. Joint Photographic Experts Group (JPEG), Joint Bi-level Image Experts Group (JBIG)); any file format (e.g. Graphics Interchange Format (GIF), Apple Macintosh Picture File Format (PICT), Tagged Image File Format (TIFF), Encapsulated Postscript (EPS); and any colour space.

Applications can be designed that take advantage of the present invention are: interactive Web Sites; online services (e.g. training); image databases and libraries; image processing; radiology and medical imaging; and image selection for digital photography.

OEM Original Equipment Manufacturer Opportunities are: Internet browser developers; Value Added Network (VAN) service providers; scanner manufacturers; printer manufacturers; and storage technology companies.

The present invention thus addresses a growing trend towards the use of more images in networks. It is envisioned that online catalogues, newspapers and image archives would use the present invention to enhance their customer's online experience. Many Internet users have expressed a dissatisfaction with their online experience because of the speed of downloading images. Internet use would increase if the end user found the experience more productive and efficient. The present invention provides developers with the engine to create these applications in order to enhance the user's online experience.

In summary, the method of the present invention provides the following steps: (1) an object is converted to net format; (2) the new file is stored in the databank; (3) the client initiates a request by indicating the image, size, resolution and colour; (4) the communication application establishes a connection between the client and the server and transmits the request message; (5) the request message is received and the server application processes the request by retrieving information from the file; (6) the response message is generated; (7) the communication application establishes a connection between the server and the client and transmits the request message; and (8) the client application interprets the response message and displays the image.

The following explanation relates to extending the present invention for specific development needs, and provides an overview of the architecture and component parts of the technology.

The following is divided into four main sections: Introduction; Architecture Overview; The Client Application Program Interface (Client API); and The Server Application Program Interface (Server API).

Both the Client API and the Server API contain Image Application/Graphical User Interface (GUI) specific functions designed for the development of the image application of the present invention. The APIs also contain Database/File System specific functions which are used to represent and facilitate interaction with an Operating System (OS)-independent external database or file system.

The APIs of the present invention are designed for maximum flexibility, providing a wide selection of development options for creating customized applications. The APIs are portable, flexible and OS-independent.

To facilitate development for both traditional client-server models and popular Internet HyperText Transport Protocol (HTTP) protocols, the embodiment is written in pure American National Standards Institute (ANSI) "C". It can be compiled by any "C" compiler. This flexibility allows maximum portability for application of the invention. The Kernel technology of the present invention is also object-oriented in approach so it can be easily maintained and extended across multiple platforms.

The APIs create a layer between the OS and the Kernal technology which makes a wide variety of cross-platform implementations possible. The Kernal simply calls the application-implemented communication functions, receives the communication handle and then passes it back to the application for processing. This layer provides maximum development flexibility since any communication method and application design can be easily integrated.

The Client API also specifies several auxiliary communication functions which are used to convert the byte order of two- and four-byte words from network to host, and conversely, from host to network. This further portability makes it possible to implement the technology of the present invention on any type of machine, regardless of the processor used. Additionally, the API also features supporting functions to facilitate both Internet and client-server implementations.

The APIs of the present invention provide extensive support for developing a customized user interface or standard menu-based GUI. The image and device parameters can be integrated in any User Interface (UI) design which provides for a selected combination of valid resolution, dimension and colour space options (the valid combinations are determined by the user's output device and the information contained in the original image source file).

The Architecture of the present invention consists of a number of components which work together simply and efficiently. The components are designed to make the development of an application easy for both traditional client-server applications, as well as for Internet applications (HTTP). The APIs provide the flexibility and functionality required to seamlessly integrate an existing external database or file system.

The architecture consists of one or a number of application components, including the GUI. The Kernel communicates with the application components/GUI through an OS-independent layer which allows the Kernel to simply pass handles to and receive handles from application specific structures. The Client API functions that control the image application development are divided into two main groups: Kernel-Implemented Functions and Application-Implemented Functions.

This bi-directional interaction between the two function groups ensures that an event-driven application shares in the workload with the aid of specific auxiliary functions. The Kernel, therefore, is particularly well-suited for operating systems which features multithreading (such as Windows 95, Windows NT, and Unix), but can also be used by non-multithreading operating systems (such as Windows 3.1). The asynchronous communication utilized by the architecture allows the control to be passed back to the application before a function has been executed. This frees up the operating system to perform other tasks.

The Image Application/GUI functions are implemented to: Create, destroy and initialize image objects; Initialize display and output devices in preparation for image rendering; Communicate with the server to receive and update image display and output information; Establish the range of valid dimension, resolution and colour space parameters for the GUI or other user interface; Display, print and export images with the assistance of auxiliary functions.

Regarding asynchronous and synchronous communication functions, the Client Image Application/GUI component must use the communication functions asynchronously. Event-driven GUI applications (such as Windows, etc.) must communicate asynchronously since calling functions cannot wait for an entire message from the server before passing control back to the application.

The database components of the architecture ensure that the application can represent the structure of an external database or file system, and perform queries for image retrieval and display in the Image Application/GUI. The database functions also provide extensive support for navigating the Database/File System structure.

For developing applications for the Internet (HTTP), the Client Database functions facilitate state creation and restoration so image information can be maintained for future sessions. The database component features functionality for flexible, keyword-based searching to closely target a selection of images for navigation, viewing, printing and exporting. The database functions also provide maximum flexibility for retrieving a limited number of images for the most efficient utilization and management of computer resources.

Regarding asynchronous and synchronous communication functions, the Client Database component may call communication functions either synchronously (if developed for a non-Windows environment) or asynchronously (if developed for a GUI/Windows environment).

The Server API contains a series of functions which facilitate communication with both the Image Application/GUI components and the external Database/File System so that image information can be retrieved for use in specific applications.

The Server functions are implemented to receive image requests from the client, retrieve user-requested information from an integrated database or file system, and return a response message to the client containing the requested image data. These communication functions are used in conjunction with a Kernel-implemented function which is used to identify the communication channel of the requesting client and to retrieve specific image data.

Regarding image application communication functions, the Server Image Application component communication functions must be implemented synchronously. Servers are not event-driven GUI applications—calling functions must wait for the entire message without passing control back to the application.

The Server API database functions are used to retrieve image information from the database or file system which stores the source images. Once the Kernal has initialized the server based on the state you select, you can then begin retrieving image domain information (the structure of the database or file system) and the image data required to render an image in a specific application.

Depending on the size of the database or file system, all the domain and image information in the database may be transferred to the server by executing a single function. If a database is too large, domain and image information can be transferred to the server on a per-request basis.

Database specific information is stored in the database handle. After receiving the database handle, the Kernel passes this handle when it calls the application-implemented functions which retrieve domain and image information. The handle containing the domain and image information is then passed back to the appropriate Kernal function.

Regarding, database/file system communication functions—synchronous, the Server Database/File System component must use the communication functions synchronously. Servers are not event-driven GUI applications; calling functions wait for the entire message without passing control back to the application.

CLIENT API FUNCTIONS

The Client API functions for the Image Application/GUI are divided into two main sections, kernel-implemented functions are application-implemented functions, with specific sub-groups for related functions.

The kernel-implemented functions include the following groups: Create, Initialize, Destroy and Restore Image-objects; Preparation functions for Display, Printing and Exporting; GUI Display and Output Functions; Updating and Displaying the Image; and Auxiliary Functions for Display, Printing and Exporting.

The application-implemented functions include the following groups: Communication and Byte Order Conversion Functions; Display, Print and Export Functions; and Conversion Functions.

The Image Application/GUI functions are divided into sub-groups based on their functionality in an application. For example, regarding kernel-implemented functions: the first group of functions—Create, Initialize, Destroy, Save and Restore Image-objects—is implemented to create the image-object structure, initialize it, destroy it, etc.; the second group of functions—Preparation functions for Display, Printing and Exporting—is implemented to prepare the application's display or output device for the image; the third group13 GUI Display and Output Functions—is implemented to build the application's user interface and to determine the application user's range of options and option selections. Before the application user can select and image for updating or printing, for example, there must be a user interface which facilitates image selection and a valid combination of resolution, dimension and colour space options; the fourth group of functions—Updating and Displaying the Image—is implemented when user selections have been determined and the image has been requested for display, printing and exporting; and the fifth group—Auxiliary Functions for Display, Printing and Exporting—is used in conjunction with the application's Display, Print and Export Functions to render an image for the appropriate output device and according to valid image output parameters (as determined by the image source file).

The application-implemented functions are divided into the following groups: communication and byte order conversion functions—is implemented to retrieve more information from the server to display, export or print an image. This group is also used to convert the byte order from network to host, and conversely, from host to network; and display, print and export functions—is implemented to render the image once the required information has been received from the server.

Kernel-Implemented Functions

This section—Kernel-Implemented Functions—is divided into several subgroups: Group 1—Create, Initialize, Destroy and Restore Image-objects, Group 2—Preparation for Display, Printing and Exporting; Group 3—GUI Display and Output Functions; Group 4—Updating and Displaying an Image; and Group 5—Auxiliary Functions for Display, Printing and Exporting.

Group 1 Functions: Create, Initialize, Destroy, Save and Restore Image-objects

This group of functions describes the creation, initialization, destruction, saving, and restoration of the image-object of the present invention—the structure which contains the information about an image. Once the object structure has been created and initialized (associated with an image ID# in the database or file system), it is can be prepared for display in the application, described in the Group 2 functions.

Group 2 Functions: Preparation Functions for Display, Printing and Exporting

This group of functions is used to prepare an image object for display, printing and exporting in an application. The display state changes based on the function called by the application. For example, if the "WRToPrint" function is called by the application and executed by the Kernel, the Kernel knows that it is currently in "print mode". The Kernel's default mode is the display mode—it's the most common mode, and the application can return to it by calling the "WRToDisplay" function.

Group 3 Functions: GUI Display and Output Functions

This group of functions is implemented to establish valid image display and output parameters and to create a user interface which facilitates the selection of a valid combination of dimension, resolution and colour quality options. The Kernel allows you to implement any type of user interface in the way that best suits the application of the present invention that is being developed.

The image parameters are determined by combining two main sources of information: the display or output device (i.e. printer, screen, etc.) and the source information contained in the original image file. The Kernel uses these two key pieces of information to determine the range of possible options for selecting, displaying, printing and exporting the images in accordance with the present invention. For example, based on the user's image and device selections, the present invention can automatically display a valid default image display. This functions as a starting point for the user's subsequent selections.

In a typical GUI implementation, this group of functions may be called by the application to create pull-down menus and menu options/items. These functions are also used to set, retrieve and determine the status of a given user selection in preparation for updating and/or the initialization of communication functions to retrieve more information from the server. Depending on the image and device information provided, a number of possible options may be disabled. For example, if the original image was created using low (8-bit) colour, the high-colour (24-bit) option might be greyed out in the application since it is not available for selection.

However, as an application developer, one is not limited to the standard, menu-based implementation. For example, using the default image setting of the present invention as a starting point for the application user, new combinations of size, resolution and colour space could be selected by clicking and dragging image handles, clicking on a resolution selection button, and selecting a colour space option on the screen.

In this implementations, all necessary selection devices would be situated graphically on the screen along with the image. All valid image display, printing or exporting parameters can be manipulated by the user without selecting menu options. If an invalid selection is attempted—for example, by dragging the image handle to an invalid dimension—the application would display an appropriate error message.

This is just one example of an alternate interface design. The critical point is that the range of valid image and device parameters remains the same, regardless of the implementation choice.

Group 4 Functions: Updating and Displaying an Image

The three previous groups of Kernel functions were used to create and initialize the image object, pass parameters for displaying, printing and exporting images, and to implement a UI to facilitate users' interactions with the application of the present invention. At this point, an image can now be requested from the server for display in the application. This group of functions works to create a communication loop that retrieves information from the server and instructs the application to begin displaying, printing or exporting an image.

This group of functions includes the "WRimRead" communication function which is used to communicate with the functions in the section—Application-Implemented Functions. If the Kernel has all the information it needs to display, print or export an image, the Update and Zoom functions can call the Display functions directly. However, if more information is needed from the server, the communication functions can be called to initiate the communication process with the server.

Group 5 Functions: Auxiliary Functions for Displaying Printing and Exporting

These functions are used in conjunction with the application-implemented display, print and export functions in Group 2—Display, Print and Export Functions. Before an application can begin displaying, printing or exporting an image, most of these functions need to be called to obtain a pointer to information about the line of the image strip that will be processed, and to retrieve other necessary information about the image-object.

The most frequently called function in this group is "WRLine"—it is called by the application to display, print or export a line of the image. The other auxiliary functions are called by the application to retrieve colour plane information, as well as the internal (the size stored in the Kernel's memory) and external (the size to be displayed by the application) size of the image.

Application-Implemented Functions

Application-implemented functions call functions implemented in the Kernel to perform various communication and print/display/export tasks. This section is divided into several subgroups: Group 1—Communication and Byte Order Conversion Functions; Group 2—Display, Print and Export Functions; and Group 3—Conversion Functions.

Group 1 Functions: Communication and Byte Order Conversion Functions

This group of functions is used to initialize communication with the server, prepare the Kernel for updating an image, and to help prepare the application to receive the information required to display, print or export an image.

This group also contains four functions that are implemented to convert the byte order of two- and four-byte words from network to host, and conversely, from host to network. Note that the byte-order conversion functions are used by all the Image Application and Database/File System components.

Using Client API Communication Functions Synchronously and Asynchronously

The Client Image Application/GUI functions of the present invention must be used asynchronously for both client-server and Internet implementations (both require event-driven GUIs).

However, in the Client Database/File System API, the communication functions may be used either synchronously or asynchronously, depending on the implementation choice. In most cases these functions are called internally by other functions. For example, if you decide to develop a application for the Internet (HTTP communication protocol), the communication functions must be implemented synchronously. However, if the application is client-server (i.e. an event-driven GUI application), the functions can also be used asynchronously.

Group 2 Functions: Display, Print and Export Functions

This group of functions is used by the application to display, print and export images in accordance with the present invention. When these functions are called by the Kernel (or when they call other functions within the application), all or part of an image is ready to be displayed, printed or exported. These functions also call the Kernel-implemented auxiliary functions (Group 5—Auxiliary Functions for Displaying, Printing and Exporting) that provide more information to the application during the display, printing and exporting process. Note that although there is no API function for printing greyscale images, the architecture of the Kernel makes it easy to implement a greyscale printing function.

Client API Functions—Database

These are the Client API functions for the integration of an external database or file system with the Image Application of the present invention:

Kernel-Implemented Functions

Group 1—Navigating the Image Category Structure; Group 2—Retrieving Image Information from the Database; Group 3—Setting Search Criteria; Group 4—Auxiliary Communication Functions; and Group 5—Functions for Internet Implementations.

Application-Implemented Functions

Group 1—Synchronous or Asynchronous Communication. Using Synchronous or Asynchronous Communication Functions: With respect to the structure of the database functions the database functions are divided into sub-groups based on application functionality. Like the Image Application/GUI functions, the Client API Database functions consist of two main sections: Kernel-Implemented Functions; and Application-Implemented Functions.

Kernel-Implemented Functions

Group 1—Navigating the Image Category Structure—is implemented to initialize the root directory and to navigate the image category structure based on the initialized root.

Group 2—Retrieving Image Information from the Database—is implemented to retrieve image-related information from the database or file system.

Group 3—Setting Search Criteria—is implemented to set the search criteria used to retrieve a specific selection of images from the database or file system.

Group 4—Auxiliary Communication Functions—is implemented to transfer information between the client and the server, to open and close sessions, and to save and restore communication sessions.

Group 5—Functions for Internet Implementations—is implemented to make Internet implementations of the Kernel technology easier. A number of functions are provided to perform some key tasks in Web browser application environments.

Application-Implemented Functions

Group 1—Synchronous or Asynchronous Communication—is implemented to verify the communication type used by the application.

The Client API Database/File System also uses the byte order conversion functions to convert the byte order of two- and four-byte words from network to host, and conversely, from host to network. These functions are WRAReadConv2, WRAReadConv4; WRAWriteConv2; WRAWRiteConv4.

Kernel-Implemented Functions

This first section—Kernel-Implemented Functions—is divided into several subgroups: Group 1—Navigating the Image Category Structure; Group 2—Retrieving Image Information from the Database; Group 3—Setting Search Criteria; Group 4—Auxiliary Communication Functions; and Group 5—Functions for Internet Implementations.

Group 1 Functions: Navigating the Image Category Structure

This group of functions is used to initialize a selected root category or directory and to navigate through the image category structure relative to the initialized root. When a category navigation session is initialized, the application user's selections are relative to the initialized root.

Group 2 Functions: Retrieving Image Information from the Database

This group of functions is used to retrieve image related information from the database or file system. The application calls these functions to build the image categories that the application user will use to retrieve image information (such as name, descriptions, IDs, etc.), navigate back and forth to the images in specific categories or directories, and to determine the total number of images retrieved and remaining.

Group 3 Functions: Setting Search Criteria

This group consists of only one function—"SetKeyWords"—to set the search criteria used to retrieve a specific selection of images from the database or file system. Given that image databases can be extremely large, establishing search parameters at the outset makes image retrieval faster and reduces the resource requirements of the application user's system. Note that the search criteria should be set before requesting images from the database or file system for display in the GUI image list.

Group 4 Functions: Auxiliary Communication Functions

These auxiliary functions are used to transfer information between the client and the server, to open and close sessions, and to save and restore communication sessions to continue work on an image. All of these auxiliary functions are called by the application.

A number of the following auxiliary functions have been designed specifically for use with Internet implementations of the Kernel technology. For more information about the functions optimized for Internet applications, please see Auxiliary Functions for Internet Applications. Note that these functions can also be used for traditional client-server implementation models as well.

Group 5 Functions: Auxiliary Functions for Internet Implementations

To make Internet implementations of the Kernel technology easier, the present invention provides a number of functions necessary to perform some key tasks in Web browser application environments. As outlined in the previous section, these functions can be used with the more traditional client-server implementations as well, but they are specifically designed for use with Internet (HTTP) applications.

Though Internet applications of the present invention may follow a number of different development paths, generally actions performed in the browser will trigger the execution of a specific function in a Common Gateway Interface (CGI) script which is stored on the server. The output generated by the execution of specific functions is then stored in the HyperText Markup Language (HTML) code of the current page. (As the application developer, you must implement a function which performs this task—the information will not be automatically stored in the Web page for later use.)

When a state needs to be restored, (i.e. when the application user decides to work on a previously edited/saved image), the CGI uses the values stored in the page to restore the previous state. Once the state of a previous image has been restored, the CGI script interacts with the browser to perform any selected functions, such as navigating the image categories in the browser or retrieving the description of an image.

There are two functions specific to the group of Internet functions—"WSetLimitNum" and "WGetImageSize". They are generally not used for traditional client-server implementations. The remaining functions, however, can be used for client-server development and they are fully described in the previous section—Group 4, Auxiliary Communication Functions.

The remaining auxiliary functions described in Group 4 can be used for both traditional and Internet client-server implementations. This section outlines how each of the remaining functions can be used specifically for Internet applications.

Application-Implemented Functions

This second section—Application-Implemented Functions—contains one group of functions: Group 1—Synchronous and Asynchronous Communication. Note that using the Synchronous or Asynchronous Communication Functions.

Group 1 Functions: Synchronous and Asynchronous Communication

The APIs of the present invention provide support for different communication types depending on the selected implementation. For example, if you choose to develop an Internet (HTTP) browser-based client application, you must use the communication functions of the present invention synchronously. However, if you are developing a client-server GUI-based application, the communication functions must be used asynchronously so control can be passed back to the application. The single function in this group—"WisAsync"—verifies the communication type for the application.

Using Asynchronous or Synchronous Communication: Functions

Depending on the communication type, you will need to implement either the synchronous or asynchronous communication functions described in the following API sections. For asynchronous implementations, please see the communication functions described in The Client API—Image Application/GUI Functions. They are located in Group 1—Communication and Byte Order Conversion Functions: WRACommWrite; WRACommBeginRead; and WRACommDoRead. For synchronous implementations, please see the communication functions described in The Server API—Image Application/GUI Functions. They are located in Group 2—Communication Functions: WRACommWrite; and WRACommRead.

Server API Functions—Image Application/GUI

The Server API functions are designed to facilitate communication and to retrieve an image in accordance with the present invention from an integrated database or file system.

Kernel-Implemented Functions

Group 1—Retrieving Image Information

Application-Implemented Functions

Group 1—Retrieving the Image from the Database. Group 2—Communication Functions.

The Server API Image Application/GUI functions are implemented synchronously to receive messages from the client, retrieve image data from the database and prepare response, message to return to the client.

When the application calls "server_cgi", it passes the communication handle which identifies the communication channel for the client which requested the image. This information is required by the server application before the desired image data can be retrieved from the database.

This function is used in conjunction with the application implemented "WRACommWrite" and "WRACommRead" communication functions.

Kernel-Implemented Functions

This first section, Kernel-Implemented Functions, consists of one group which currently consists of one function: Group 1—Retrieving Image Information. Note that additional functions will added in the near future to facilitate the retrieval of images from the database.

Group 1 Functions: Retrieving Image Information

The single function currently in this group—"server_cgi"—is used synchronously to assist in the retrieval of image data from the database.

Application-Implemented Functions

This second section, Application-Implemented Functions, consists of two groups of functions which need to be supplied by the developer: Group 1—Retrieving the Image from the Database; and Group 2—Communication Functions.

Group 1 Functions: Retrieving the Image from the Database

This section currently consists of one function—"GiveFile"—which is implemented synchronously by the application to provide the buffer address of the requested image data. The Server Image Application Kernel calls this function to retrieve the image data required for outputting the image in the selected device and within the range of valid display/print/export parameters. Note that although there is currently only one function in this group, other functions will be added soon to optimize the retrieval of image data in blocks.

Group 2 Functions: Communication Functions

The Image Application/GUI contains two functions which are used synchronously for server applications (i.e. applications which are not event-driven). Note that these functions are also used synchronously for the Server API Database/File System component.

The Server Image Application functions of the present invention must be used synchronously for both client-server and Internet implementations. Server applications do not feature event-driven GUIs and therefore do not use asynchronous communication.

Server API Functions—Database/File System

The Server API functions are designed to facilitate communication with the database or file system and provide message information to the client application. The implementation of the following Server API functions depends on the initial state set for the server by the application developer. Note that the Server API Database/File System functions are used synchronously for both client-server and Internet implementations. For more information, please refer to Using Client API Communication Functions Synchronously and Asynchronously.

These are the Server API functions for the integration of an external database or file system with a application.

Kernel-Implemented Functions

Group 1—Initializing the Server for Database Communication

Application-Implemented Functions

Group 1—Initializing the Server State and Generating the Database Handle; Group 2—Retrieving Domain and Image Information; and Group 3—Using Synchronous Communication Functions.

The Server API database/file system functions are described according to their functionality in an application.

Depending on the state established for the server, a specific order of functions must be implemented before the server can communicate with the database/file system and send the appropriate message to the application.

For example, if the application developer decides to initialize the server only (i.e., not retrieve the domain and image information) using the "WGetInitState" function, then the "WUGetDomain" function and the "WUGetImages" would need to be called subsequently to retrieve the domain information and the images.

In order for the Kernel to communicate with the database or file system, "WRequest" calls "WGetDbInfo" and "WGetInitState" (both application-implemented functions) internally to retrieve information that is specific to the application-implemented file storage and retrieval system.

Kernel-Implemented Functions

This first section, Kernel-Implemented Functions, consists of one group: Group 1—Initializing the Server for Database Communication.

Group 1 Functions: Initializing the Server for Database Communication

This section consists of only one function—"WRequest"—which is implemented to initialize the server based on its current state. Once the server is initialized, the Kernel can begin retrieving images for display and manipulation in the application.

Application-Implemented Functions

This second section—Application-Implemented Functions—consists of three groups which are supplied by the application developer, Group 1—Initializing the Server State and Generating the Database Handle; Group 2—Retrieving Domain and Image Information; and Group 3—Using Synchronous Communication Functions.

Group 1 Functions: Initializing the Server State and Generating the Database Handle This section consists of two functions. "WGetInitState" is implemented by the application developer to initialize the server based on the specifications of the database. Once the server is initialized, the Kernel can retrieve the appropriate state information it needs to retrieve the information requested by the client application functions. "WGetDBInfo" is also implemented by the application to return the database handle which is used by the Kernel to retrieve image and domain information.

Group 2 Functions: Retrieving Domain and Image Information

This section consists of two functions. "WUGetDomain" is implemented by the application developer and called by the Kernel to retrieve domain information from the database. This is required before image information can be retrieved. Once domain information has been retrieved, the Kernel calls the "WUGetImages" function to retrieve images stored within the domain structure.

Group 3 Functions: Using Synchronous Communication Functions

Since the Server Database/File System component must use synchronous communication, you will need to implement the synchronous communication functions described in: the Server API—Image Application/GUI Functions. They are located in Group 2—Communication Functions: WRACommWrite; and WRACommRead.

Numerous modifications, variations and adaptations may be made to the particular embodiments of the invention described above without departing from the scope of the invention, which is defined in the claims.

I claim:

1. A method of downloading a plurality of levels of an image stored in a differential hierarchical format, utilizing a client API and a server API, comprising the steps of:

identifying at the client API a required level of an image;

determining at the client API the levels of the image required to be downloaded;

generating at the client API a request to the server API, the request including an image identifier to identify the image, and a list of stripe to be downloaded, the list of stripe including a number associated with the level of the image, a number associated with the strip, and a number associated with the required colour;

transferring from the server API to the client API a plurality of messages specifying the required strips for an intermediate level; and processing at the client API the messages to create the required image levels.

2. A method as defined in claim 1, wherein there is transferred from the server API to the client API one message for every strip in the final image level to enable the processing at the client API of the messages to create the required image levels in a strip by strip fashion.

3. A method as defined in claim 1, wherein the images, once created at the client API, are stored until the image is no longer required.

4. A method of creating and storing an image on a computer file, to enable a plurality of different versions of the image to be accessible by a user, the method comprising the steps of:

(a) reading a file of an image;

(b) processing the image to form a hierarchical digital representation of the image including a plurality of different versions of the image; and (c) storing the hierarchical digital representation of the image as a second file on a computer readable storage medium, wherein the second file has a pyramidal structure with minimum information of the image at the top of the pyramidal structure and the full, original image at the bottom of the pyramidal structure and, wherein the different layers of the image provide the following versions of the image: an icon; a thumbnail sketch; a screen quality image at 72 dpi; a printer quality image at 300 dpi; and a professional printer image at 1200 dpi.

5. A system for retrieving an image from a network, the system comprising:

(1) a server application;

(2) a plurality of image files, each storing an image in a plurality of different versions, and connected to the server application;

(3) a client application which enables a user to select a retrieve a desired version of a desired image; and (4) a communication application providing a communication link between the client and server applications, wherein, in use, the user can select a desired image and a desired version of that desired image for retrieval and display, wherein the client application enables a user, for a desired image, to select the size, resolution and number of colors for the desired version of the image.

6. A system as claimed in claim 5, wherein each of the images is stored as a hierarchical digital representation of the image which includes minimum information at the top of the pyramidal structure and a complete original image at the bottom of the pyramidal structure.

7. A system as claimed in claim 6, wherein each hierarchical digital representation of an image includes an icon, a thumbnail, a screen version of the image at 72 dpi, a printer version of the image at 300 dpi and a professional printer version of the image at 1200 dpi.

* * * * *